March 10, 1953  H. HAGE  2,630,879
DUST COLLECTING BAG AND FILTER FOR VACUUM CLEANERS
Filed April 15, 1950

INVENTOR
HILDUR HAGE
BY Samuel J. Stoll
ATTORNEY

Patented Mar. 10, 1953

2,630,879

UNITED STATES PATENT OFFICE 2,630,879

DUST COLLECTING BAG AND FILTER FOR VACUUM CLEANERS

Hildur Hage, St. Albans, N. Y.

Application April 15, 1950, Serial No. 156,127

1 Claim. (Cl. 183—51)

This invention relates to a dust collecting bag and filter for vacuum cleaners.

Vacuum cleaners of the type shown and described in Patent No. 2,198,568, issued to Edward H. Yonkers, Jr. on April 23, 1940, are generally provided with a cellulose filter and a metal dust collecting pan or container. The pan or container must be emptied from time to time in order to dispose of the collected dust. This is a messy process which housewives invariably detest.

It is the principal object of this invention to provide a combination dust collecting bag and filter which may be used in connection with the aforementioned type of vacuum cleaner. It comprises a paper bag or a bag made of other disposable material, which may be introduced into the dust collecting pan or container. A cellulose filter or a filter made of other suitable material is either permanently or detachably fastened to the bag and it occupies the same general position in the pan or container which the cellulose filter in the Yonkers patent is shown to occupy. An opening is provided in the side of the bag to register with a corresponding opening in the side wall of the dust collecting pan or container to provide communication between the suction hose and the inside of said bag. The air impeller is mounted on the opposite side of the filter from the bag. Thus the vacuum cleaner under discussion performs in precisely the same manner as the vacuum cleaner in the Yonkers patent performs, with the sole exception that the dust is collected in a bag instead of in the pan or container itself. The problem of disposing of the collected dust is accordingly greatly simplified. The dust may be disposed of by simply disposing of the bag which contains it.

The invention may assume two important forms: in the one form the filter and bag are permanently attached to each other, and in the second form, they are supported separately and are held together only temporarily between the top of the dust collecting pan or container and the peripheral flange on the cone-shaped perforated plate against which the filter rests. No change is contemplated or required in the construction of the vacuum cleaner itself.

It appears necessary to anchor the bottom wall of the dust collecting bag to the floor of the dust collecting pan or container. This may be achieved in many ways and by various means. Preferred methods and means are shown in the accompanying drawing. In one case, a cellulose adhesive is used to detachably secure the bottom wall of the bag to the floor of the pan or container. In another case, the dust collecting bag is provided with a bead or flange along its peripheral bottom edge and a sleeve or ring or other suitable retaining member is provided to engage said bead or flange and hold it down upon the floor of the pan or container. In both cases the bag may readily be removed from the pan or container for dust disposing purposes.

Preferred forms of this invention are shown in the accompanying drawing in which.

Figure 1:
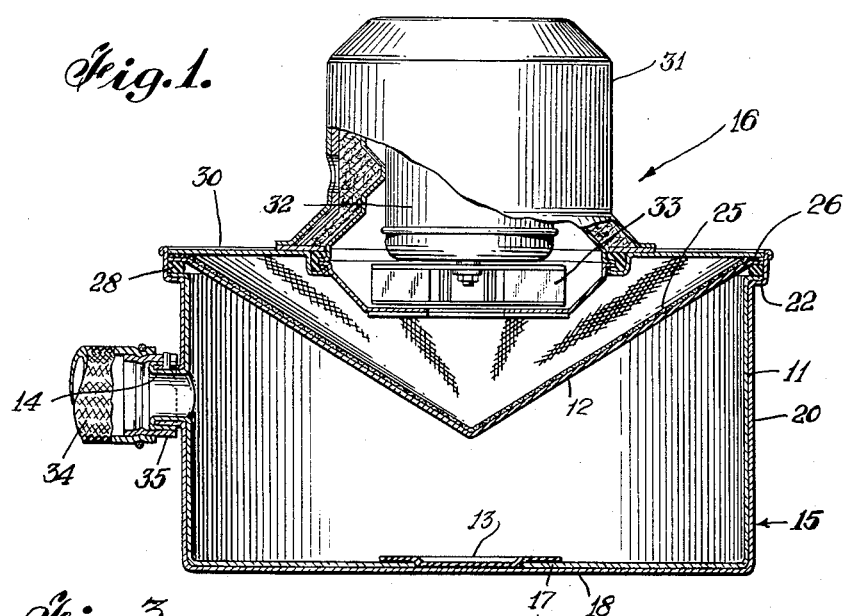
Fig. 1 is a side view of a vacuum cleaner in which a dust collecting bag and filter are installed, the housing and pan of said vacuum cleaner being broken away and partly in section to disclose said bag and filter in section. In this illustration, the bag and the filter are not permanently fastened to each other.
Figure 2:
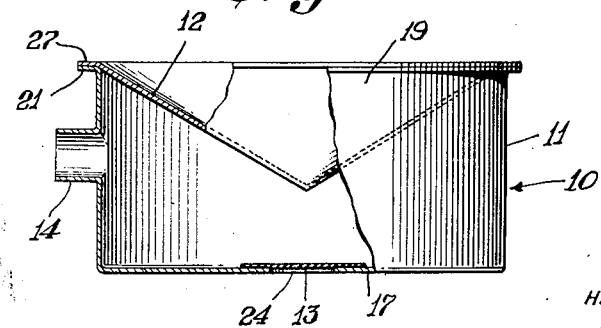
Fig. 2 is a side view, also partly broken away and in section, of the dust collecting bag and filter shown in Fig. 1.

Referring now to Fig. 2, it will be seen that the first form of dust collecting bag and filter 10 comprises the following elements: a bag 11, a filter 12, an adhesive member 13, and a tubular intake member 14. Bag 11 is shaped for insertion into the pan or container 15 of vacuum cleaner 16. Since the container is generally cylindrical in shape, so is the bag. The respective dimensions of said bag and said container are such that the bottom wall 17 rests snugly upon floor 18 of the container and cylindrical wall 19 of the bag rests snugly against the inside surface of cylindrical wall 20 of the container. A peripheral flange 21 is formed along the top edge of bag 11, extending radially outwardly therefrom. This annular flange 21 is adapted to rest upon annular shoulder 22 of said container. Tubular intake member 14 of the bag is adapted to register with tubular inlet member 23 of the container, and to project therethrough. It will be noted that an opening 24 is formed in the bottom wall 17 of the bag and it will be further noted that adhesive member 13 extends across said opening. More specifically, the adhesive member is affixed to the inside of the bag, its adhesive side or surface facing downwardly. Thus by pressing upon the top of said adhesive member, it may be caused to project through said opening 24 and to secure itself to the floor of the container. See Fig. 1.

Filter 12 is cone-shaped. The angle which it describes corresponds to the angle of the cone-shaped perforated plate 25 of the vacuum cleaner. Like said cone-shaped plate 25 which has an annular flange 26 formed peripherally thereof and extending radially outwardly therefrom, filter 12 has an annular flange 27 which is also formed peripherally thereof and extending radially outwardly therefrom. Flange 21 of the bag, flange 27 of the filter, and flange 26 of the perforated plate all correspond to each other and they are all adapted to be supported by the annular shoulder 22 of the pan or container. They may be supported directly upon said shoulder or upon an annular gasket 28, or flange 21 of the bag may be supported on said flange 21, and the filter flange 27 may then be supported upon said gasket. See Fig. 1. Flange 26 of the perforated plate may then rest upon flange 27 of the filter and the cone-shaped perforated plate itself may then rest upon said cone-shaped filter.

The vacuum cleaner includes a cover plate 30 which supports the motor housing 31 and a motor 32. Said cover plate may be attached to the top of annular flange 26 of perforated plate 25. The air impeller 33 projects downwardly into the cone-shaped perforated plate 25 and when the machine is in operation, it sucks air through a suction nozzle (not shown) the suction hose 34, tubular hose inlet member 14 of the bag, into said bag, through filter 12 and thence through the perforated plate 25. The weight of the motor housing, motor, cover plate and cone-shaped perforated plate, holds the flanges of the filter and bag tight upon the annular shoulder of the pan or container. Clamps may also be provided to fasten said cover plate and perforated plate to the pan or container, and by the same token said clamps will also hold the flanges of the filter and bag in place. The suction which will be set up, will tend to suck up the bottom wall of the bag and to press it against the under surface of the filter. Adhesive member 13 is designed to prevent such contingency and its effect is to anchor the bottom wall of the bag securely, though temporarily, to the floor of the container.

Tubular inlet member 14 of the bag projects through inlet member 23 of the container as Fig. 1 clearly shows. It may then be curled back upon said tubular inlet member 23 and held in place by the clamp sleeve 35 of the suction hose 34. This too is clearly shown in Fig. 1.

The foregoing is illustrative of a preferred form of dust collecting bag and filter. Obviously other forms and modifications of this form may be provided within the broad scope of the invention. For example, only one hole 24 is shown formed in the bottom wall of the bag and a single adhesive sheet 13 is shown to cover, and to be exposed by, said hole. Should it be found more desirable to provide a plurality of holes instead of only a single hole, and an adhesive sheet or sheets covering said plurality of holes, this may very readily be done within the scope of the invention. Another possibility is to provide an adhesive coating to the under side of the bottom wall of the bag in place of the adhesive member 13. This, however, would be a matter of choice and not of invention. The material of which the bag and filter should be made are also matters of choice rather than invention. The bag should be made of non-filterable paper or other suitable material. The filter should preferably be made of conventional cellulose filtering material. Inlet portion 14 may or may not be integral with the bag proper. It is shown to be integral in Fig. 2, but this does not necessarily have to be the case. It may comprise a completely separate member which is secured to the bag by a suitable adhesive or other suitable means.

Figure 3:
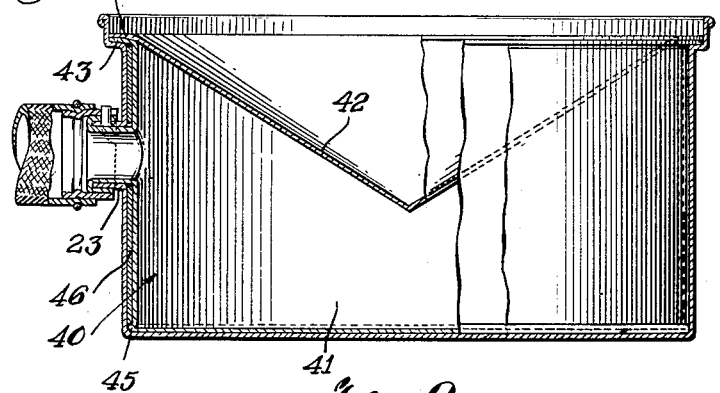
Fig. 3 is another view, somewhat similar to that of Fig. 1, showing another form of dust collecting bag and filter, wherein the bag and the filter are permanently fastened to each other.

The combination dust collecting bag and filter 40 shown in Fig. 3 differs from the bag and filter shown in Figs. 1 and 2 in several important respects. In the first place, combination dust collecting bag and filter 40 comprises a bag 41 and a cone-shaped filter 42 which is permanently fastened thereto. More specifically, bag 41 is provided with an annular flange 43 and filter 42 is provided with an annular flange 44 and said flanges are permanently fastened to each other by suitable means, such as adhesive. The flanges are supported on the annular shoulder of the pan or container in the manner above described, either directly upon said annular shoulder or upon the annular washer 28. No adhesive means are provided to hold the bottom wall of the bag flat upon the floor of the pan or container against the suction forces which are set up by the motor driven impeller. Instead an annular flange or bead 45 is provided along the bottom edge of the bag, extending radially outwardly therefrom. A sleeve or ring 46 is inserted into said pan or container, between the side wall of said pan or container and the side wall of the bag. It rests upon, or engages, bead 45 of the bag and holds said bead down upon the floor of the pan or container. Sleeve or ring 46 may itself be held in place in the container either frictionally or tensionally, or simply by virtue of the fact that the perforated cone-shaped plate rests upon it. It is immaterial what means are provided for holding said sleeve or ring 46 in place in the container so long as said sleeve or ring engages the bead of the bag and holds said bag down in proper, operative position on the floor of the container.

This form of the invention may also be modified, and other forms provided within the broad scope and coverage of the invention. Thus retaining member 46 may comprise a cylindrical sleeve, or a full or split ring, as desired. It may assume other forms equally as well and it may be made of imperforate or perforate material, it may comprise simply a cylindrically shaped frame, or a narrow band, or even a spring wire. Its precise shape and the materials of which it is made are wholly unimportant. What is important is that it engage the bead of the bag and hold the bag in place on the floor of the container.

I claim:

A dust collecting device for use in a vacuum cleaner casing, comprising a bag having a bottom and a side wall shaped to fit in the vacuum cleaner casing, a filter element in the top of the bag, the bottom of the bag being formed with an opening, a securing member extending over the top face of the bottom of the bag, said securing member having its under face adhesively coated and disposed over the opening in the bottom of the bag and adapted to engage the underlying portion of the vacuum cleaner casing to secure the bag against rising upwardly in the casing.

HILDUR HAGE.

REFERENCES CITED

The following references are of record in the file of this patent:

UNITED STATES PATENTS

| Number | Name | Date |
|---|---|---|
| 1,992,042 | Rurka | Feb. 19, 1935 |
| 2,025,946 | Wenner-Gren | Dec. 31, 1935 |
| 2,198,568 | Yonkers | Apr. 23, 1940 |

FOREIGN PATENTS

| Number | Country | Date |
|---|---|---|
| 27,340 | Great Britain | Nov. 21, 1912 |
| 717,005 | France | Oct. 13, 1931 |